Sept. 24, 1929. E. J. HAYMAN Re. 17,442
METALLIC ROOF JOINT
Original Filed Sept. 26, 1927
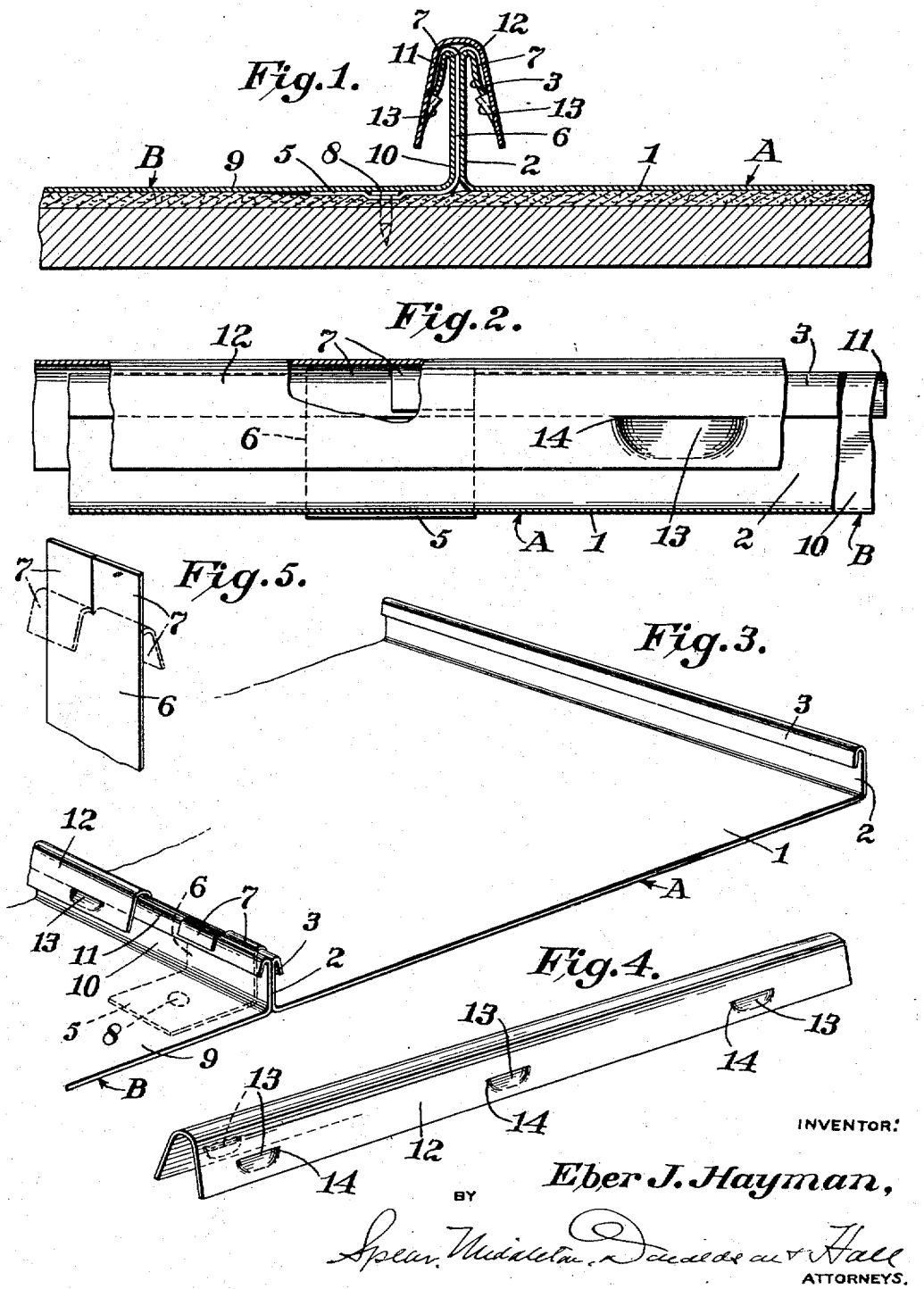
INVENTOR:
Eber J. Hayman,
BY
Spear, Middleton, Donaldson & Hall
ATTORNEYS.

UNITED STATES PATENT OFFICE

EBER J. HAYMAN, OF PARKERSBURG, WEST VIRGINIA

METALLIC-ROOF JOINT

Original application filed September 26, 1927, Serial No. 222,006. Divided and application filed April 19, 1928, Serial No. 271,344. Original No. 1,693,274, dated November 27, 1928. Application for reissue filed May 17, 1929. Serial No. 363,927.

My present invention relates to a joint for metallic members which is particularly adapted for locking together metal sheets in the formation of a tin or metal roof.

The principal object of the invention is the provision of a joint of the type described which will be water-tight, which will permit of the sheets being secured to the wooden roof sheathing without the securing means passing through the sheets themselves, and which provides a lock for the abutting parts.

Another important object of the invention is the provision of a construction which will permit ready separation of the parts should the same be necessary without mutilation of the metal strips so that they may be again used.

This application is a division of my copending application Serial Number 222,006, filed September 26, 1927.

To this end the invention contemplates a metal roof comprising elongated sheet elements having their extreme longitudinal edges formed into an upstanding wall having a return bent portion turned back towards the main body or sheet. This bend may be either sharp or arcuate. In use two of these longitudinally extending sheets will be placed adjacent to each other so that the upstanding wall along one longitudinal edge of each of two sheets will substantially abut each other, the return or bent portion of each wall extending in the opposite direction. I have found it desirable to provide a cleat or fastening element having an upstanding wall and a return bent portion adapted to partially overlie the bend in one of the longitudinal edge portions of the main roofing element, the remainder of the cleat adapted to lie flat upon the roof sheathing and to be nailed thereto. With such a construction, a second elongated sheet member may then be placed in position with the main body of the cleat underlying the same, the relation of the upstanding wall on the two adjacent sheet members existing as before.

A cap having offset locks therein may now be snapped over the two return bent portions of the sheet members, the offset locks engaging and opposing the raw edge of the return bent portions. This cap effectively locks the two sheet elements together, and makes the joint between the two upstanding walls of waterproof nature.

The invention further consists in the novel arrangement, construction, and combination of parts hereinafter described, and shown in the accompanying drawings, in which Fig. 1 is a sectional view of a device embodying the invention.

Fig. 2 is a side elevation of Fig. 1.

Fig. 3 is a perspective view of a complete sheet of metal constructed as in Fig. 1.

Fig. 4 is a detail of a cap element.

Fig. 5 is a detail of a portion of a cleat or fastening element.

Referring now with particularity to the drawings, I have shown a metallic element at A of elongated form, which consists of a main body 1 and a marginal wall 2 upstanding therefrom. The top of the wall is provided with a portion 3 bent or returned toward the main body. The opposite longitudinal edge of the sheet A is likewise provided with the same upstanding wall and return bent portion. The body 1 is adapted to lie upon the ordinary roof sheathing.

A second like metal element B having a body 9 and upstanding wall 10 is provided, the top of the wall 10 being returned bent as at 11, and in a similar manner to the longitudinal edge construction of the sheet A.

A cleat is provided consisting of a flat portion 5 with a wall 6, slit to form hook-shaped portions 7, the hooks overlying the bends formed by the upstanding wall and the return bent portion of each of the elements A and B, the flat base 5 of the cleat being adapted to be nailed to the roof sheathing as by nail 8. This effectively secures the sheets A and B to the roof.

Over the two return bent portions 3 and 11, I place a cap or saddle 12 provided with a series of offset locks 13. It is to be noted that the marginal edges of the cap 12 are sufficient in extent to project beyond the marginal edge of the return bent portions 3 and 11, and that the lock 13 is located in this portion.

The lock itself consists simply of an offset part of the metal formed by slitting the cap as at 14 and deforming that part of the metal on one side of the slot to form an offset. It is to be noted that this offset portion must therefore of necessity be provided with a raw edge, and that this edge merges with the main body of the cap.

Upon placing the cap 12 in position as shown in Fig. 1, the lock 13 will snap under the return bent portions 3 and 11, the raw edge of the lock engaging and opposing the raw edge of the return bent portions. In this manner the two elongated sheets A and B are securely latched or locked together by means of the cap, and to the roof sheathing by means of the cleat and its nail, and at the same time providing a water proof joint between the sheets A and B without perforating them in order to secure the same to the roof.

It is to be noted that this invention contemplates a cap overlying a return bent portion of an upstanding wall of each of two abutting sheets, and that the cap and return bent portions are locked together by means of a resilient offset lock in one element, engaging a raw edge in the other element.

Having thus described my invention what I claim is:

1. A roof joint comprising elongated metallic sections, the adjacent longitudinal edge portion of each section having an upstanding wall and a return bent portion, returned towards its respective body, a cap overlying both return bent portions, a raw edge in the cap engaging a raw edge in each of the return bent portions.

2. A roof joint comprising elongated metallic sections, the adjacent edge of each section having an upstanding wall, each wall having return bent portions returned towards its respective section, a cap overlying both return bent portions, and extending beyond the same, and an offset lock in the projecting portion of the cap, and including a raw edge engaging and opposing a raw edge in the return bent portion.

3. A roof joint comprising elongated metallic sections, the adjacent edge of each section having an upstanding wall, each wall having return bent portions returned toward its respective section, a cap overlying both return bent portions and extending beyond the same, an offset lock in the extending portion entirely beyond the return bent portion, a raw edge of the lock engaging the raw edge of the return bent portion.

4. A roofing joint comprising metallic sections, the adjacent edge portion of which have each an upstanding wall and a return bent portion attached at its upper end to the upstanding wall and extending free towards the body portion of the sheet and a cap overlying both return bent portions and having preformed portions to snap under and into interlocking engagement with an edge of the return bent portions when the cap is pressed downwardly relative to said return bent portions, said cap comprising flanges attached together at their upper ends and free at their lower ends, substantially as described.

5. A roofing joint according to claim 4 in which the return bent portions extend downwardly at a diverging angle to the upstanding walls and the preformed portions of the cap consist of spaced apart projections pressed out and extending inwardly from the wall of the cap, substantially as described.

6. A roofing joint according to claim 4 in which the preformed portions of the cap consists of projections pressed inwardly from the wall of the cap within the margin thereof.

7. A roof joint comprising a metallic section having an upstanding wall with a return bent portion depending from its upper edge, and a covering wall having a preformed portion to snap under and into interlocking engagement with the lower edge of the return bent portion when the covering wall is pressed downwardly relative to said return bent portion, both the return bent portion and the overlying wall being free from their upper ends downwardly.

8. A roof joint according to claim 7 in which the return bent portion extends at a downwardly diverging angle to the upstanding wall and the covering wall also extends at a downwardly diverging angle to the said upstanding wall, substantially as described.

9. A roof joint according to claim 7 in which the preformed portion consists of a projection pressed inwardly from the body of the wall within the margin thereof.

10. A roof joint according to claim 7 in which the covering wall is separable from the return bent portion by a relative longitudinal sliding movement of one wall in respect to the other wall, substantially as described.

In testimony whereof I affix my signature.

EBER J. HAYMAN.